(12) United States Patent
Morlec

(10) Patent No.: US 8,890,893 B2
(45) Date of Patent: Nov. 18, 2014

(54) DATA PROCESSING AND DISPLAY SYSTEM

(75) Inventor: Cecile Morlec, Lamasquere (FR)

(73) Assignee: Airbus Operations S.A.S., Toulouse (FR)

( * ) Notice: Subject to any disclaimer, the term of this patent is extended or adjusted under 35 U.S.C. 154(b) by 687 days.

(21) Appl. No.: 12/671,682

(22) PCT Filed: Aug. 5, 2008

(86) PCT No.: PCT/FR2008/051462
§ 371 (c)(1),
(2), (4) Date: Mar. 21, 2011

(87) PCT Pub. No.: WO2009/022080
PCT Pub. Date: Feb. 19, 2009

(65) Prior Publication Data
US 2011/0157222 A1    Jun. 30, 2011

(30) Foreign Application Priority Data
Aug. 8, 2007   (FR) ...................................... 07 56999

(51) Int. Cl.
G09G 5/00 (2006.01)
G06F 3/14 (2006.01)
G01C 23/00 (2006.01)

(52) U.S. Cl.
CPC .............. G06F 3/14 (2013.01); G09G 2352/00 (2013.01); G01C 23/005 (2013.01); G09G 2340/10 (2013.01); G09G 2340/14 (2013.01); G09G 2380/12 (2013.01)
USPC ............ 345/629; 715/733; 715/714; 715/716

(58) Field of Classification Search
USPC ............................................................ 345/1
See application file for complete search history.

(56) References Cited

U.S. PATENT DOCUMENTS

| 6,061,756 | A  | * | 5/2000  | Dutton et al. ................. 710/311 |
| 6,317,714 | B1 | * | 11/2001 | Del Castillo et al. ......... 704/270 |
| 6,353,779 | B1 |   | 3/2002  | Simon et al. |
| 6,486,914 | B1 | * | 11/2002 | Anderson ................ 348/333.02 |
| 6,650,754 | B2 | * | 11/2003 | Akiyama et al. .............. 380/278 |
| 7,376,900 | B2 | * | 5/2008  | Guido et al. ................... 715/742 |
| 7,437,750 | B1 | * | 10/2008 | Sonoda et al. ................... 725/61 |
| 2003/0026342 | A1 | * | 2/2003 | Horiike et al. ........... 375/240.25 |
| 2003/0179320 | A1 | * | 9/2003 | Kim .............................. 348/732 |
| 2004/0046712 | A1 |   | 3/2004 | Naimer et al. |
| 2004/0153672 | A1 | * | 8/2004 | Watt et al. ..................... 713/201 |
| 2004/0254691 | A1 |   | 12/2004 | Subelet |
| 2005/0024387 | A1 | * | 2/2005 | Ratnakar et al. .............. 345/629 |
| 2005/0066275 | A1 |   | 3/2005 | Gannon |
| 2005/0138645 | A1 | * | 6/2005 | Lu ................................. 719/321 |
| 2005/0200502 | A1 |   | 9/2005 | Reusser et al. |
| 2006/0176278 | A1 | * | 8/2006 | Mathews et al. .............. 345/168 |
| 2007/0240063 | A1 | * | 10/2007 | Cheng et al. .................. 715/741 |
| 2011/0157222 | A1 | * | 6/2011 | Morlec ........................ 345/629 |

OTHER PUBLICATIONS

International Search Report dated Jan. 23, 2009.

* cited by examiner

*Primary Examiner* — Andrew Goldberg
(74) *Attorney, Agent, or Firm* — Ingrassia Fisher & Lorenz, P.C.

(57) ABSTRACT

A data processing and display system includes processing and display means adapted for displaying, from a more secured domain and on a same screen of a display processing device, information data from one or more less secured domains and active data from the more secured domain as a superimposition.

7 Claims, 5 Drawing Sheets

DATA PROCESSING AND DISPLAY SYSTEM

CROSS-REFERENCE TO RELATED APPLICATIONS

Figure 1A:
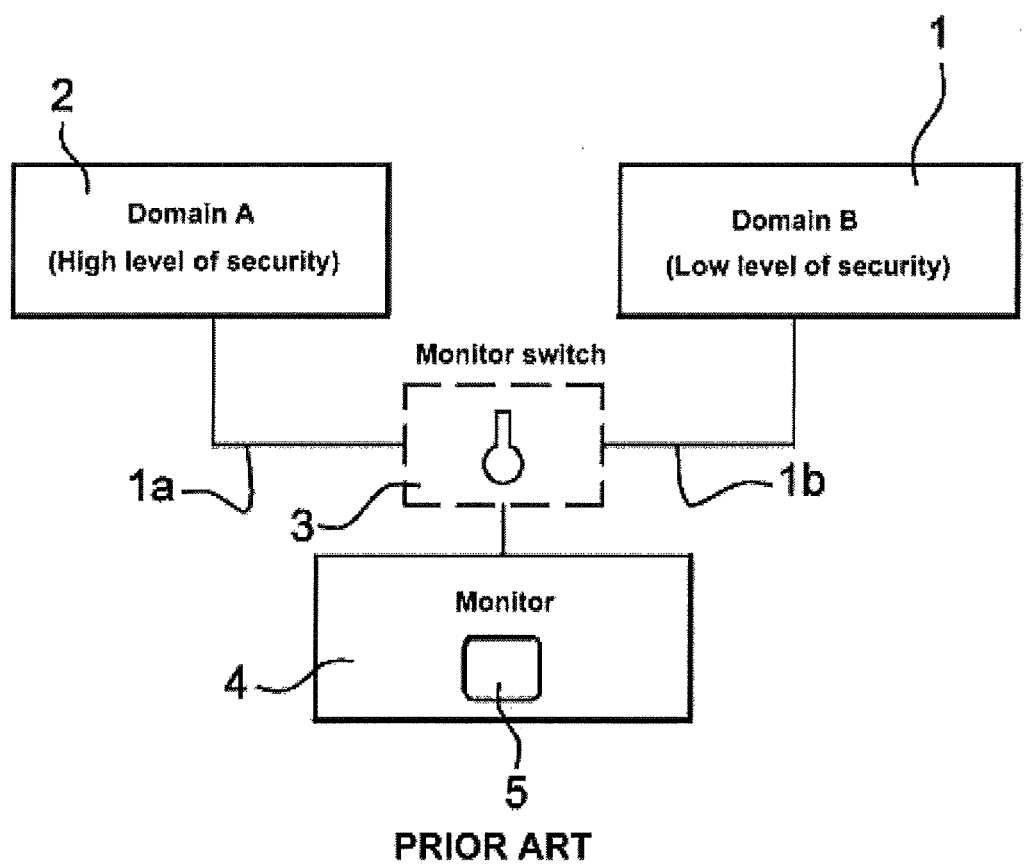

This application is the National Stage of International Application No. PCT/FR2008/051462 International Filing Date, 5 Aug. 2008, which designated the United States of America, and which International Application was published under PCT Article 21 (s) as WO Publication No. WO2009/022080 A1 and which claims priority from, and the benefit of, French Application No. 2007/56999 filed 8 Aug. 2007, the disclosures of which are incorporated herein by reference in their entireties.

The disclosed embodiments relate to a data processing and display system in the context of displaying on the same screen active and/or passive information originating from domains whose security or confidence levels are different.

BACKGROUND

It is useful especially in the field of aeronautics and for aircraft whose information systems are segregated into different security domains, for example in the case of civilian airplanes, AIRBUS A380, A350 airplanes.

In such a context, for example, it is necessary to display active and/or passive messages originating from domains whose security or confidence levels are different on the same screen without segregation of the screen by multiplexing or by other means, partly so that an operator is able to confirm the launching of an action in the more secure domain, while keeping on the screen the messages originating from the less secure domain.

There is reason to do this while reducing the risks of malevolent attacks leading to an erroneous display, especially of passive data, informative data for example, while reducing the amount of data exchanged from the less secure domain toward the more secure domain, and taking into account the ease of use by the simultaneous display of data originating from the two domains.

Also, for reasons of security, the use of a means of segregating the screen into multiple zones, each zone corresponding to the display of messages originating from a domain with different security, by multiplexing for example, is not suitable.

The current technique in aircraft electronics in particular consists of using a display device alternately between the domains to be viewed.

An example of a high-security domain is the architecture of the systems from the domain of aircraft flight.

To process and display parameters of the aircraft flight functions, for example the data on the fuel supply systems, the data on control cutoffs for various aircraft electronics circuits, these systems are linked to a display processing device in the form of a console with a screen and human-machine interface means such as a keyboard, or means for moving and pointing on the screen such as a wheel pointer or a mouse.

The display processing device is able to receive data from the flight-related systems. These data are sent from flight-related embedded systems, and depending on these data the pilots have to take actions that pass through the flight-related systems.

Depending on the actions of the pilots, such as key validation or touch-screen selection from menus, or enabling or disabling systems, the display processing device is able to relay the parameters of the operator actions such as the position of the cursor and pressure on an icon displayed on the screen by the flight-related systems.

The architecture of the flight-related systems is a highly secure architecture that is designed so that no intrusion into the networks of this system that might interfere with operation can be possible.

Because of this, it must not be possible for commands or messages from one domain, for example such as embedded test or maintenance systems like the management system from the maintenance manuals, to be displayed directly at the same time and on the same screen of the display processing device as the messages from the flight-related systems, thus permitting actions on these systems.

The current solution is to switch the display-processing device manually or automatically from one of these domains to the other.

This has the drawback in the case of maintenance in particular of preventing the operator from consulting his electronic manual while he acts on the flight-related systems.

For example, a maintenance operation on the circuit breakers of a system corresponds to a page of the maintenance manual.

When this page is selected, the display processing device is switched to the display of the page of the manual.

If this manual page asks an action to be performed to start or disable the operation of certain circuit breakers, the operator has to switch the display device to the flight-related data display to be able to execute the actions requested.

Doing this, he loses the display of the page of the manual that he was just consulting, which is a problem in terms of risking an error and of ergonomics.

To solve this problem it is then common to have the more secure domain display a confirmation window, possibly with a brief description of the action launched. The launching of the action is then confirmed by the operator using the system.

According to hypothesis No. 1, the confirmation window opened by the more secure domain completely masks the information window displayed by the less secure domain, since it is not possible to segregate the screen or to permit the 2 domains to have access to it simultaneously.

According to hypothesis No. 2, for security reasons, only simple commands will transfer from the less secure domain to the more secure domain. The description and the context of the action launched, information originating from the more secure domain, will accordingly be very succinct, or nonexistent.

Therefore, the problem is that the operator no longer has at his disposal the information originating from the less secure domain when he has to confirm the launching of the action. Now the exact description of the action and its context from which flow its acceptance or refusal to launch the action is written right in the messages originating from the less secure domain.

The problem to be solved is accordingly to preserve the display of data originating from the less secure domain when the display has been switched to the more secure domain to launch actions.

Accordingly, it is necessary to find a means of keeping certain data from the maintenance manual displayed with full security during the display of flight-related data, while preventing any interference by the less secure maintenance domain systems with the more secure systems in the flight-related domain.

SUMMARY

The solution proposed by the disclosed embodiments is based on means that permit a more secure domain to display on the same screen a portion of the informative data originating from a less secure domain on the one hand, and on the other hand a superimposed portion of the active data from the more secure domain.

The system is always composed of two domains with distinct securities, and a monitor. The monitor can always be switched manually or automatically into one of the two domains, but the two domains cannot in any case use this monitor simultaneously.

It is desired, on the other hand, for the less secure domain to display on the screen a certain number of messages, and to be able to request the launching of an action that can be accomplished only by the more secure domain. It is then necessary for the more secure level to take the "responsibility" for effectively launching the execution of the action.

To do this, the disclosed embodiments propose a data processing and display system characterized in that it comprises means of processing and display capable of displaying from a more secure domain and on the same screen of a display processing device, on the one hand informative data originating from one or more less secure domains, and on the other hand superimposed active data from the more secure domain.

The system of the disclosed embodiments advantageously comprises means for selecting capable of manually or automatically switching the processing and display means into one of the two domains, and able to prohibit the simultaneous use of the processing and display means by the two domains.

According to a particular embodiment, the processing and display means are part of the more secure domain, with this domain having a control module able to receive data from the less secure domain(s) and to manage the display of these data.

The data from the less secure domain(s) are preferably passive data.

According to an advantageous embodiment, the system of the disclosed embodiments is such that the more secure domain comprises means of filtering that can authorize the display of active data from the single more secure domain.

It advantageously comprises means for launching one or more commands from the active data into and from the more secure domain.

In this case, the more secure domain preferably has means of defining active zones of the screen and of limiting these active zones to a display zone of a command window displayed by this domain.

The means of processing and display are also preferably capable of prohibiting the presence of means of human-machine interface in the zones of the screen other than the active zones.

According to a particular solution, the system of the disclosed embodiments comprises means of sequential processing able to display first the messages originating from a first module for sending data from the less secure domain(s), and then those originating from a second module for sending data from the more secure domain.

According to a preferred embodiment of the disclosed embodiments, the processing and display system has a link between at least a first computer of the less secure domain and a second computer of the more secure domain, to allow the passage of a matrix of data from the less secure domain to the more secure domain.

The matrix is advantageously in a predefined and reduced format excluding the passage of command data.

The matrix is preferably also defined to contain only representative information on the data and in a format of fixed size.

Always according to this last embodiment, the more secure domain in particular has means for causing a display of the information contained in the matrix in a solely passive manner.

Figure 1B:
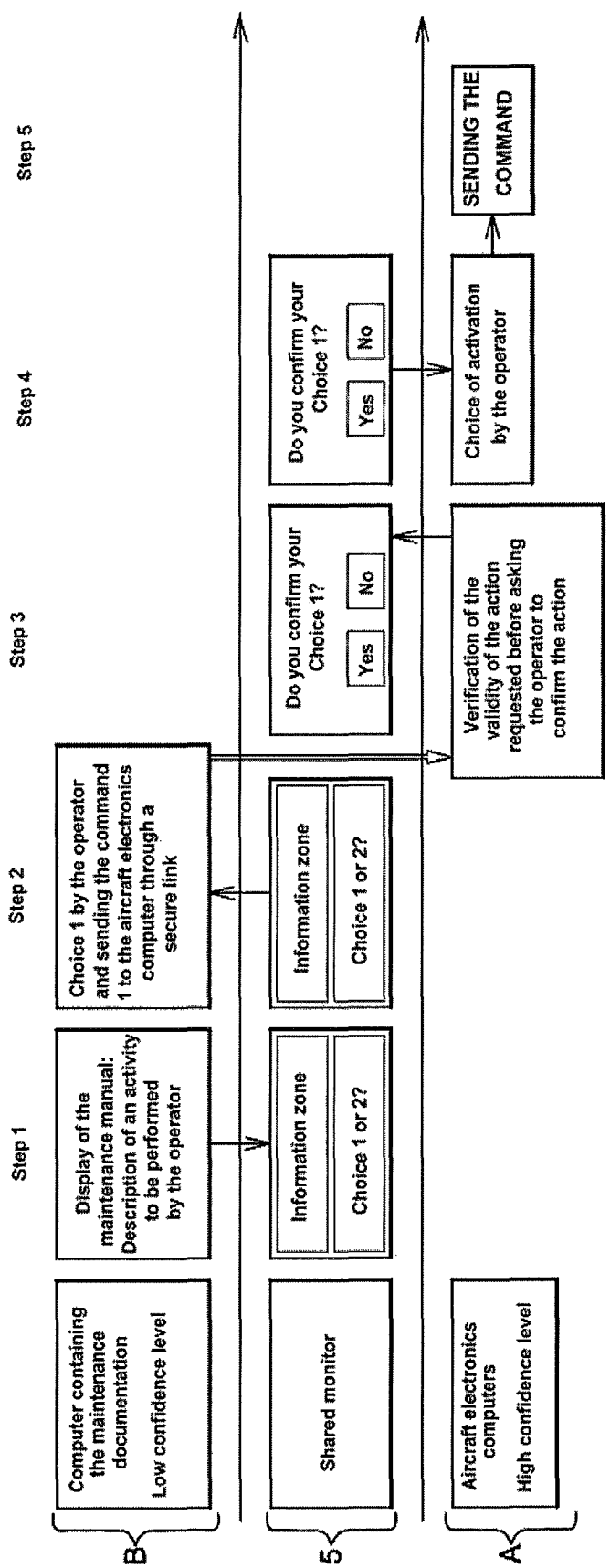
Figure 2:
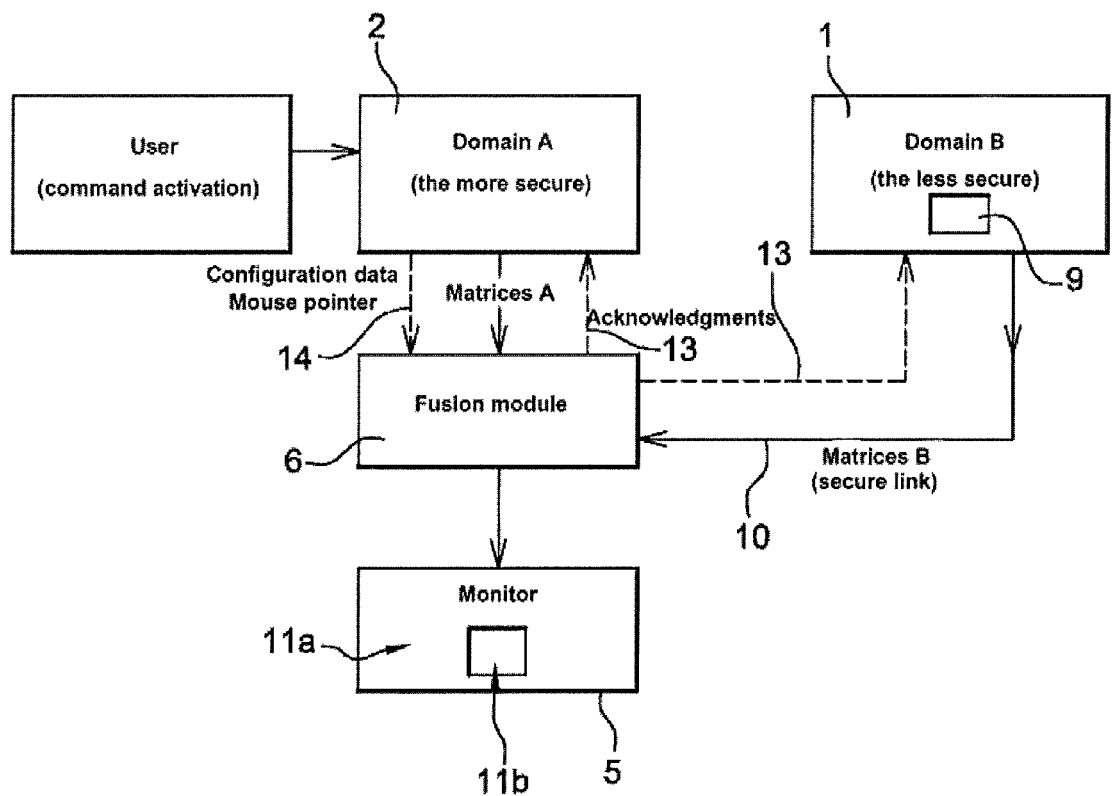
Figure 3:
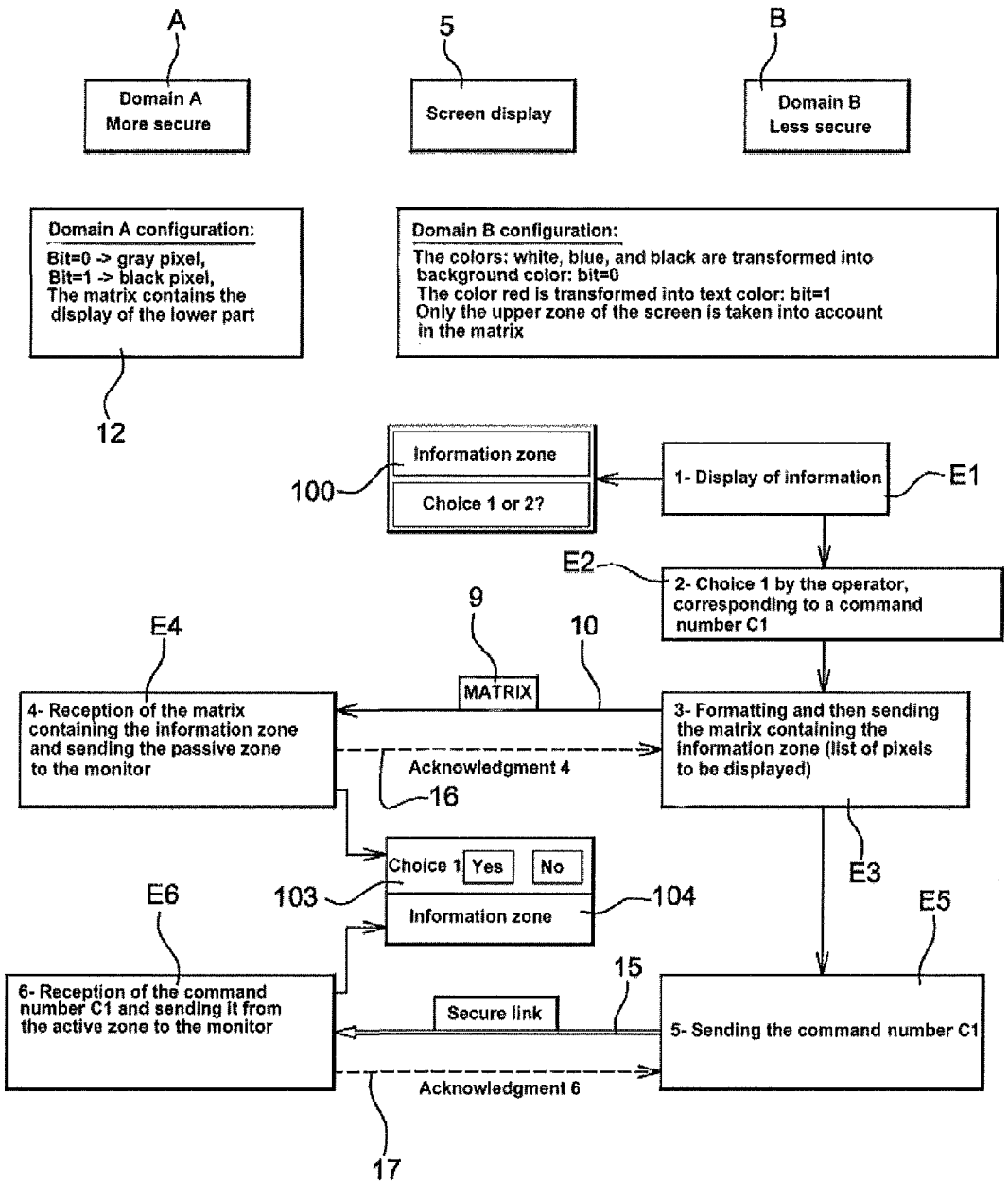
Figure 4:
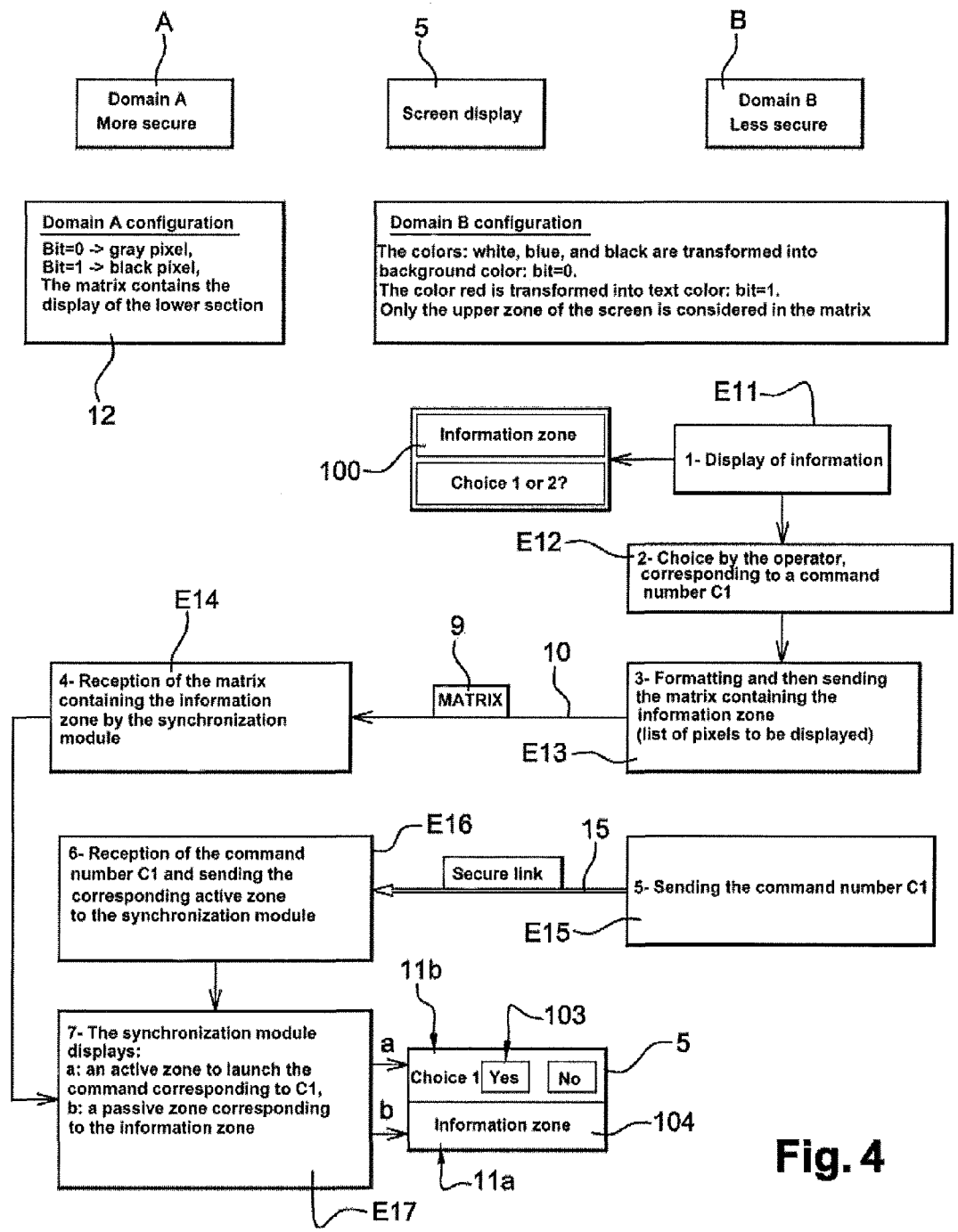

Other characteristics and benefits of the disclosed embodiments will be apparent from reading the following description of a non-limiting example of embodiment with reference to the drawings, which show:

BRIEF DESCRIPTION OF THE DRAWINGS in FIGS. 1A and 1B: a schematic representation of the device for displaying two domains of the prior art;

in FIG. 2: a schematic representation of an example of embodiment of a system of the disclosed embodiments;

in FIG. 3: a schematic representation of the steps for displaying information from a less secure domain and commands to a more secure domain pursuant to the disclosed embodiments;

in FIG. 4: a schematic representation of the steps for displaying information from a less secure domain and commands to a more secure domain pursuant to a variant of the disclosed embodiments.

DETAILED DESCRIPTION

In the context of the example shown, two domains are considered: a more secure domain A and a less secure domain B.

An embedded aircraft electronics system will be called a domain, whether it is a complex system comprising a group of computers in a network, the associated software and protocols, and the drivers and sensors of this system, or a simple system comprising a single computer and its associated software depending on the level of complexity of the functions processed by this system.

Domain A in particular can be the management system for the flight parameters, flight commands and controls, the fuel management system, or the system combining all of the functions necessary for flying the aircraft.

Domain B, for example, can be the computerized maintenance management system, a non-safety-related cabin system, or the like.

The disclosed embodiments apply, for example, to the performance of airplane maintenance operations for which the operator has to perform actions on the aircraft electronics system of the instrument from a maintenance manual contained in a maintenance computer.

display processing device that has a common screen and a common human-machine interface console for the computerized networks of the two domains is also considered to be within the scope of the disclosed embodiments, wherein the two domains can make use of the display processing device separately (not simultaneously).

Thus, when an application from domain A is using the screen of the display processing device, then the applications from domain B cannot use this screen, and vice versa.

FIG. 1A represents a solution from the prior art.

The less secure domain B is shown schematically as the rectangle 1.

High-level security domain A is shown schematically as the rectangle 2.

The data 1a, 1b to be displayed from these two domains are sent to a switch 3 actuated manually or automatically, which directs the information to a display processing device 4 comprising a monitor 5.

The aircraft electronics computer is part of the more secure domain A since it allows direct action on the airplane controls.

The maintenance computer in particular contains the maintenance manual. For the manual to be able to be updated regularly at minimum cost, it has to stay readily modifiable, accordingly in a computer where the security level is lower than that of the aircraft electronics computer. The maintenance computer is a computer in the less secure domain B.

According to FIG. 1A, no link exists between the two domains.

For reasons of security, the segregation between the aircraft electronics computer and the maintenance manual prevents initiating actions performed by the aircraft electronics computer directly from the maintenance computer.

Accordingly, it is from the aircraft electronics computer that the action has to be confirmed so that before confirmation and from the available data in the aircraft electronics computer on the validity of the action requested by the operator, it can verify and then execute this action if necessary.

The diagram of FIG. 1B concerns a variant for which a command number can be sent from domain B to domain A through a secure link, for which the monitor 5 switches automatically from one domain to the other.

However, this figure shows that because of the segregation between the systems, when the maintenance operator decides to activate the command (Steps 3 and 4), then he no longer can see the maintenance manual (Steps 1 and 2), that can help him to validate and accordingly confirm this choice.

The operators complain about this lack of visibility that exists with the use of the maintenance computer, compared with the use of a paper manual, for example. It is difficult for them to comprehend that the confirmation window cannot be included in the same window as the maintenance manual. That would permit retaining all of the information available in the maintenance manual. This information in every case is much more complete than the information available from the aircraft electronics computer.

The solution proposed, shown in FIGS. 2, 3, and 4, is based on the possibility of having the more secure domain A display on the same monitor or screen 5, the informative and passive data originating from one or more less secure domains B on the one hand, and active date on the other hand from domain A with a higher level of security.

The active data are possible actions by the user: display of a zone on which the user can act (buttons, sensor areas, checkboxes, etc.), which permit the initiation of one or more commands from the more secure domain, and in this same domain.

In this context, the data processing and display system of the disclosed embodiments comprises means for processing and displaying capable of displaying from the more secure domain A, on the one hand, informative data originating from one or more less secure domains B on an inactive area 11a of the monitor and on the same screen of the display processing device, and on the other hand active data from the more secure domain on an active zone 11b of the monitor.

To do this, as shown in FIG. 2, a link 10 is established between at least a first computer 1 of the less secure domain and a second computer 2 of the more secure domain, to permit passage of a matrix of data 9 from the less secure domain to the more secure domain.

To avoid any accidental corruption of the matrix and to be able to check the data easily, the matrix 9 has to have the simplest possible format and has to be as reduced as possible. This is necessary to prevent the matrix from containing usable malicious code, and so that its display does not necessitate processing that permits such code to be executed, for example a decompression.

In addition, the data originating from domain B must be displayed by domain A only on the inactive zones 11a of the screen, and domain A must have sole control of color configuration.

All of the data in the matrix are predefined—number of displayable colors, size of the matrix, and exact list of the pixels contained in the matrix.

The informative data are thus sent from one of the less secure domains B to the more secure domain A in a matrix 9 whose format is simple, comprising only information representative of the data to be displayed, without either configuration or command parameters. The matrix is predefined and of fixed size.

Furthermore, the information contained in this matrix is solely intended to be displayed in a passive manner with no user action possible, in the manner of a screen background.

This is controlled by means of transfer arranged in the more secure domain, and for example in a display management computer that has a fusion module 6 according to FIG. 2.

This allows for:
reducing the risks of malevolent attack during the display of erroneous passive informative data. The more secure domain is thus protected against any malevolent attack.

For purposes of security, the number of colors displayable by the domain B will be limited, and the range of colors will also be defined by the display management device 12 of the more secure domain as a function of the function of the color. This allows for:
reducing the risks of malevolent use, permitting the production of very vivid displays because of the set of colors of the monitor,
more convenient use, since it is necessary for the user to be able to see visually the fact that the information is passive,
limiting the volume of the matrix exchanged from the less secure domain to the more secure domain, and accordingly enabling the use of architectures whose means of linkage between the two domains are potentially weak on an embedded system, for example.

In this case, the more secure domain preferably has means for defining active zones of the screen and limiting these active zones to a display zone of a command window displayed by this domain.

The display processing means are also preferably able to prohibit the presence of means for human-machine interface in the zones of the screen other than the active zones.

The only link between the two sending modules is preferably a means of linkage permitting the sending of synchronizations of the less secure domain to the module of the more secure domain.

The system of the disclosed embodiments advantageously has a device for filtering commands associated with a firewall and with a system for authenticating and verifying the integrity of the data of the less secure domain(s).

Fusion of the data for the monitor is accomplished in a fusion or synchronization module 6, whose security level is identical with that of the more secure domain A, and which:
can receive from domain B only the predefined display matrices,
can receive data, in particular matrices to be displayed, from the more secure domain,
can send fused matrices to be displayed to the monitor.

The reception or the sending of supplementary data can be considered, such as:

reception by the fusion module 6 of data for the display processing device, for example of configuration or mouse or ball pointer data 14 of the display processing device originating from the more secure domain.

As certain data would make the system more susceptible to malevolent attacks, these supplementary communications are preferably limited, for example:

to the sending of acknowledgments 13 from the fusion or synchronization module of data for the monitor to one domain or the other.

According to FIG. 3, the more secure domain manages the displays of the less secure domain in the step of choosing the command to be performed on the systems of the more secure domain.

The more secure domain A is shown on the left of the figure, the screen or monitor 5 at the center, and the less secure domain B on the right.

In this example the separation of the information 104 originating from the less secure domain and information 103 from the more secure domain on the same monitor 5 is accomplished under the control of the computer of the more secure domain without performing a preliminary common fusion of the data.

In this case, in steps E1, display of information, and E2, choice by the operator of a command corresponding to a given command number, C1 in the example, the monitor displays first the information originating from the less secure module B.

When the operator has made the choice of command, the computer of the less secure domain B sends a matrix 9 containing the information from the information zone to the computer of the more secure domain A.

The computer of domain A receives the matrix and sends to the monitor the information from the passive zone 104 to be displayed, containing the information provided by domain A in step E4.

The computer of domain A sends an acknowledgment matrix 16 to the computer of domain B.

The latter then in step E5 sends the command number to be accomplished to the computer of domain A through a secure link 15.

In step E6, the computer of domain A sends the information for the active zone 103 to the monitor, corresponding to the command C1 to be performed.

The data for the passive zone 104 and data for the active zone 103 for the monitor can be segregated by software or hardware.

The advantage of the hardware solution is that it is more robust over time, since it is less sensitive to the development of the methods and knowledge of piracy.

The residual risk is of the content of the matrix 9 being modified coherently by malevolence or by accident in domain B during its creation, or of a coherent matrix being sent by a third party to domain A.

This can be detected by an integrity control and/or an authentication between the domains and the data fusion module for the monitor.

This strengthens the security of the data fusion module for the monitor, avoiding the reception of non-integral data, or data whose origin is not authorized.

In case it is desired to display data originating from multiple domains, then the less secure domains send the data to the module of the more secure domain. All of these data in this case will then also be passive. Only the more secure domain will be able to display active data.

FIG. 4 corresponds to a variant of embodiment of the system for which domain A comprises a computer of the synchronization module or fusion module type, which manages the display and the data for the active and passive zones 103, 104:

in step E11, the less secure domain B, rectangle 1, displays information 100 on the screen 5, in step E12, the operator requests the activation of a command C1 that is to be performed by the more secure domain A, in step E13, domain B sends to domain A a matrix 9 of fixed size representing the list of colors of the pixels to be displayed on the screen and the formatting of the information zone, in step E14, domain A receives the matrix 9 in a synchronization module, in step E15, the computer of the less secure domain sends the number of the command chosen by the operator through a secure link 15, in step E16, the computer of domain A receives the number of the command and sends to its synchronization module the parameters of the active zone of the human-machine interface for the command to be displayed, in step E17, the synchronization module of domain A displays on the screen 5 the human-machine interface (HMI) of the command, which occupies only a portion 11a of the window, the active zone 103, and displays the pixels described in the pixel matrix sent by domain B in the parts of the screen 11a not occupied by the HMI of the command, the information zone 104.

The synchronization module constitutes means of sequential processing capable of displaying first the information originating from a first module for sending data from the less secure domain(s), and then those originating from a second module for sending data from the more secure domain.

The synchronization module of the more secure domain also constitutes means for defining active zones of the screen and limiting these active zones to a display zone for a command window displayed by this domain that can prohibit the presence of human-machine interface means in the zones of the screen other than the active zones.

In FIG. 4, the parameters for the information zone 100 at the top of the screen 5 whose display is required by domain B are sent to domain A. The display 104 of this information zone by domain A uses different colors, and the display zone of domain A on the screen is different.

For the system to be secure, the following requirements are taken into account in the framework of the disclosed embodiments:

The active zones 103 of the screen, i.e. the zones where the operator using the pointer or the keyboard of the display processing device can validate an action or choose between two actions, are defined by domain A and limited to the display zone 11a of the command window displayed by this domain. The other zones of the screen 104 do not contain active elements of HMI.

The list of colors used for the display of the information for domain B from domain A must be as small as possible (2 colors being ideal).

These colors are defined by domain A from the function of each color. Domain B has to translate its display in a number of colors managed by domain A.

For example, if domain B displays 24 colors while domain A accepts only 2 colors originating from domain B (background color and text color, for example), then domain B has to translate its screen display command in only 2 colors, with these 2 colors corresponding to the two functionalities processed by domain A.

The size of the matrix of pixels is fixed and predefined; its content represents all or part or several parts of the screen displayed by domain B. The position of the pixels contained in the matrix is predetermined and known jointly by the two domains.

The content is actually a list of bits, with each group of bits describing one or two pixels, depending on whether the screen contains an even or odd number of pixels.

For example, if domain A manages a number n of colors, then each group of nb bits, wherein nb=[whole number portion of (n/2+0.5)], provides for describing one pixel.

For example, for 2 colors C1 and C2, a single bit permits describing the pixel:
if the bit is equal to 0 then the color is C1,
if the bit is equal to 1 then the color is C2.
In the case of 3 colors C1, C2, and C3, 2 bits permit describing the pixel:
if the bits are equal to 00 then the color is C1,
if the bits are equal to 01 then the color is C2,
if the bits are equal to 10 or 11 then the color is C3.
In the case in which the number of pixels described is equal to p, then the size of the matrix is:
whole number portion of ([p*nb*8+7]/8) octets.

For example, if it is desired to describe 200 pixels in 2 colors, then the size of the matrix is the whole number portion of ([200*8+7]/8)=200 octets.

If it is desired to describe 207 pixels in 3 colors, then the size of the matrix is the whole number portion of ([200*2*8+7]/8)=414 octets.

Thus the matrix is precisely defined and the useless data are eliminated, either when the matrix is transmitted or by a filtering device in the processing module of the more secure domain.

The disclosed embodiments described in the context of an example of application to the display of data from a non-secure domain, such as the maintenance computers of an aircraft, and the performance of actions in a secure domain of the aircraft, is not limited to this example, and is applicable to any system comprising at least two domains with different levels of security included in the scope of the claims.

The invention claimed is:

1. A data processing and display system comprising:
a control module within a more secure computer system domain, the control module receives only a predefined set of data in a matrix of fixed size from one or more less secure computer system domains having a lower level of security than the more secure computer system domain, and manages a display of the received predefined set of data in the fixed size matrix from the one or more less secure computer system domains as only passive data and manages a display of active data from the more secure computer system domain at the same time,
a display device coupled to the more secure computer system domain, the display device displaying data received from the control module, the data received from the control module including the passive data originating from the one or more less secure computer system domains, and the active data from the more secure computer system domain, as managed by the control module, and
an active zone of the display device for displaying the active data and for launching one or more commands for the more secure computer system domain,
wherein the one or more less secure computer system domains comprise a separate distinct computer from the more secure computer system domain, and the matrix contains data generated by the one or more less secure computer system domains, the data comprising a predefined, predetermined number of displayable colors and a list of predetermined pixels to be displayed on the display device.

2. The data processing and display system pursuant to claim 1, comprising a switch for manually or automatically switching the display device directly between one of the two computer system domains, and for prohibiting the simultaneous use of the display device directly by the two computer system domains.

3. The data processing and display system pursuant to claim 1, wherein the more secure computer system domain comprises means for authorizing the display of active data from the more secure computer system domain.

4. The data processing and display system pursuant to claim 3, wherein the more secure computer system domain comprises means for defining the active zone of the display device and limiting the active zone to a display zone of a command window provided by the more secure computer system domain, and for prohibiting the presence of human-machine interface means outside the active zone.

5. The data processing and display system pursuant to claim 4, comprising means for sequential processing for first displaying information originating from a first module for sending data from the one or more less secure computer system domains, and then displaying information originating from a second module for sending data from the more secure computer system domain.

6. The data processing and display system pursuant to claim 5, comprising a link between at least one first computer of the less secure computer system domain and a second computer of the more secure computer system domain, to permit passage of the predefined set of data in the matrix of fixed size in a predefined format, containing only information representative of data to be displayed and excluding passage of command data from the less secure computer system domain to the more secure computer system domain.

7. A data processing and display system comprising:
a control module of a more secure computer system domain, the control module receives only a predefined set of data in a matrix of fixed size from one or more less secure computer system domains having a lower level of security than the more secure computer system domain, and manages a display of the received predefined set of data in the fixed size matrix from the one or more less secure computer system domains as only passive data and manages a display of active data from the more secure computer system domain at the same time,
a display device coupled to the more secure computer system domain, the display device displaying data received from the control module, the data received from the control module including the passive data originating from the one or more less secure computer system domains, and the active data from the more secure computer system domain, as managed by the control module,
an active zone of the display device that displays the active data and for launching one or more commands for the more secure computer system domain, and
an inactive area of the display device that displays the passive data,
wherein the presence of human-machine interface means is prohibited in the inactive area, the one or more less secure computer system domains comprise a separate distinct computer from the more secure computer system domain, and the matrix contains data generated by the one or more less secure computer system domains, the data comprising a predefined, predetermined number of displayable colors and a list of predetermined pixels to be displayed on the display device.

\* \* \* \* \*